United States Patent
Jiang et al.

(10) Patent No.: US 7,752,587 B2
(45) Date of Patent: Jul. 6, 2010

(54) VERTICALLY TAPERED TRANSMISSION LINE FOR OPTIMAL SIGNAL TRANSITION IN HIGH-SPEED MULTI-LAYER BALL GRID ARRAY PACKAGES

(75) Inventors: Xiaohong Jiang, San Jose, CA (US); Hong Shi, Santa Rosa, CA (US)

(73) Assignee: Altera Corporation, San Jose, CA (US)

( * ) Notice: Subject to any disclaimer, the term of this patent is extended or adjusted under 35 U.S.C. 154(b) by 74 days.

(21) Appl. No.: 11/857,940

(22) Filed: Sep. 19, 2007

(65) Prior Publication Data
US 2009/0077523 A1 Mar. 19, 2009

(51) Int. Cl.
G06F 17/50 (2006.01)
(52) U.S. Cl. .......................... 716/10; 716/9
(58) Field of Classification Search ............. 716/8–12
See application file for complete search history.

(56) References Cited

U.S. PATENT DOCUMENTS

| | | | |
|---|---|---|---|
| 6,161,215 A * | 12/2000 | Hollenbeck et al. | 716/15 |
| 6,509,644 B2 * | 1/2003 | Lee | 257/728 |
| 2004/0108586 A1 * | 6/2004 | Lamson et al. | 257/691 |
| 2006/0218514 A1 * | 9/2006 | Uchida | 716/5 |

* cited by examiner

*Primary Examiner*—Jack Chiang
*Assistant Examiner*—Binh C Tat
(74) *Attorney, Agent, or Firm*—Matine Penilla & Gencarella, LLP

(57) ABSTRACT

Broadly speaking, the embodiments of the present invention fill the need for methods of designing vertical transmission lines for optimal signal transition in multi-layer BGA packages. By controlling the impedance and geometry continuity of micro vias in each micro via layer in the package to follow smooth impedance and geometry curves from layer to layer, the return loss and insertion loss of the transmission line can be reduced or controlled to within acceptable ranges.

23 Claims, 11 Drawing Sheets

— 506

530   — 527

529   — 528

560   — 557

— 556

559   — 558

VERTICALLY TAPERED TRANSMISSION LINE FOR OPTIMAL SIGNAL TRANSITION IN HIGH-SPEED MULTI-LAYER BALL GRID ARRAY PACKAGES

BACKGROUND

Electronic components include electronic devices, such as field programmable gate arrays (FPGAs), application specific integrated circuits (ASICs), and other integrated circuits, supported on a printed circuit board (PCB). These electronic devices are manufactured on semiconductor substrates by sequential processing operations. Multiple electronic devices can be manufactured on a single substrate. These multiple electronic devices on the single substrate are sliced into multiple dies (or chips) after the sequential processing operations are completed and all the devices are formed. Prior to being placed on the PCB, these electronic devices (or dies) are placed in packages to allow the devices to be handled and to be electrically coupled to the PCB. There are vias and interconnects (wires) embedded in multiple substrate layers in packages that provide an electrical network for the die to be electrically coupled to the PCB and to enable access to other devices. The packaged dies are then disposed on the PCB through metallic connections, such as a ball grid array (BGA) or other suitable packaging configurations.

In high-speed multi-layer package design, efforts have been focused on optimizing the horizontal transmission lines to reduce signal distortion or loss. Little attention has been paid to the vertical transition, which includes micro-via to plated through hole (PTH) and BGA ball interconnection. With the increase in number of layers of interconnections and the need to support broader bandwidth, return loss and/or insertion loss caused by vertical transition discontinuity are becoming dominant design concerns.

Therefore, there is a need for methods of designing vertical transmission lines for optimal signal transition in multi-layer BGA packages.

SUMMARY

Broadly speaking, the embodiments of the present invention fill the need for methods of designing vertical transmission lines for optimal signal transition in multi-layer BGA packages. By controlling the impedance and geometry continuity of micro vias in each micro via layer in the package to follow smooth impedance and geometry curves from layer to layer, the return loss and insertion loss of the transmission line can be reduced or controlled to within acceptable ranges. It should be appreciated that the present invention can be implemented in numerous ways. Several inventive embodiments of the present invention are described below.

The description includes a method for designing placement locations of micro vias of a via layer of a transmission line in a multi-layer ball grid array (BGA) package for a semiconductor die. The micro vias include signal vias and ground vias. In the method, a target impedance value for the via layer is first determined. The determined target impedance value for the layer falls along a smooth impedance curve between an impedance of a bump and an impedance of a ball of a BGA of the multi-layer BGA. Afterwards, placement location(s) of signal via(s) are determined. The placement location(s) of the signal via(s) should follow design constraints of manufacturing. In one embodiment, the placement location(s) of the signal vias are determined to avoid vertical geometry discontinuities in the multi-layer BGA. By avoiding vertical geometry discontinuity, the operating bandwidth can be widened.

After the placement location(s) of signal via(s) is determined, the initial placement locations of ground vias are determined (or calculated) by using an analytical equation. The equation allows the distance between the ground vias and the signal via(s) to be determined. Since the location(s) of the signal via(s) has been determined, the initial placement locations can be determined if the distance between the ground vias and the signal via(s) is known. Since the analytical equation is made with many assumptions, the placement locations of ground vias determined by using the analytical equation are not very accurate and can only used as initial estimation.

Once the initial placement locations of ground vias are determined, they need to be checked to conform to the design restraints of manufacturing to ensure the placement locations do not violate the constraints. If the constraints have been violated, the placement locations are adjusted. Afterwards, a simulation tool is used to calculate the impedance of the via layer. If the calculated impedance of the via layer meets the target impedance value, the placement locations of the signal and ground vias of the via layer are accepted. If the calculated impedance of the via layer does not meet the target impedance value, the placement locations of the ground vias are adjusted and the impedance of the via layer is recalculated, the determining operation being repeated until the calculated impedance of the via layer meets the target impedance value.

Other aspects and advantages of the invention will become more apparent from the following detailed description, taken in conjunction with the accompanying drawings, illustrating by way of example the present invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
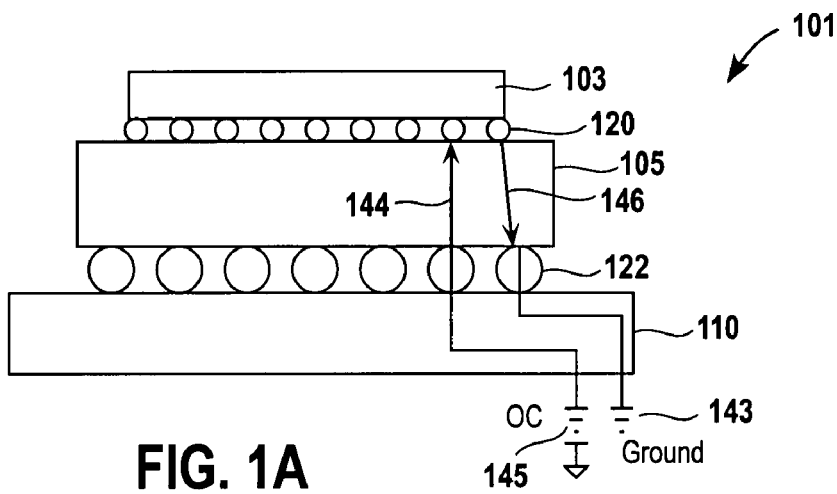
FIG. 1A is an illustration showing an exemplary cross-section of a die package disposed over a PCB, in accordance with one embodiment of the present invention.

FIG. 1A depicts one aspect of circuit package 101 according to one embodiment of the present invention. The circuit package 101 includes a die 103, a first substrate 105, a second substrate 110, connection bumps 120, and ball grid array (BGA) ball 122. Die 103 is a semiconductor chip, such as field programmable gate arrays (FPGAs), application specific integrated circuits (ASICs), flash memories, and complex programmable logic devices (CPLDs). Die 103 can also be any semiconductor chip or integrated circuit. Substrate 105 is a package for die 103. Substrate 105 provides interconnects between die 103 and the second substrate 110 through chip connection bumps 120 and the solder balls 122, which is part of a ball grid array (BGA). In one embodiment, the second substrate 110 is a printed circuit board (PCB). In another embodiment, a DC power supply 145 and a ground 143 are provided through the second substrate 110. The DC power supply 145 provides a supply voltage to die 103 to activate a device (not shown) on die 103 through a power path 144. The electric flow generated by the activated device is grounded through a return path 146. The supply voltage for the devices on die 103 could be a single voltage or multiple voltages, supplied by multiple power supplies. Examples of supply voltages for devices include, but are not limited to, 5.0 V (volts), 3.3 V, 2.5 V, 1.8 V, and smaller voltages, etc.

Figure 1B:
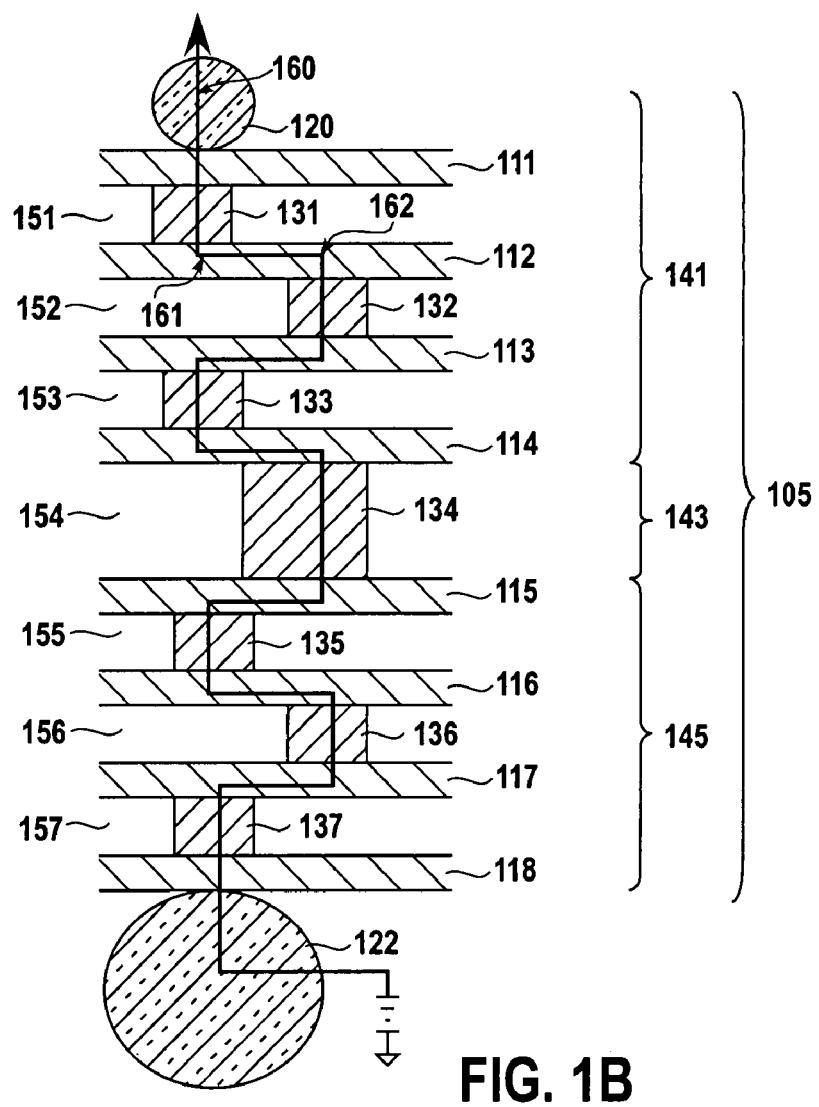
FIG. 1B is an illustration showing an exemplary cross-section of substrate layers with micro vias, plated thru hole (PTH), and interconnect wires, and ball in a transmission line of the package shown in FIG. 1A, in accordance with one embodiment of the present invention.

FIG. 1B shows a cross-sectional side view of an embodiment of the first substrate 105, in accordance with one embodiment of the present invention. As shown in FIG. 1B, the first substrate 105 includes four conductive layers 141 formed above a core 143 and four conductive layers 145 formed below core 143. Core 143 is fabricated from a dielectric, in one embodiment. The four conductive layers 141 formed above core 143 include 111, 112, 113, and 114. The four conductive layers 145 formed below core 143 correspond to the layers 115, 116, 117, and 118. Substrate 105, shown in FIG. 1B, illustrates the coupling of signals between bump 120 and ball grid array (BGA) ball 122. The signals are coupled from the bump 120 to the BGA ball 122 by micro vias 131, 132, 133, 135, 136, and 137, and plated through hole 134. Methods for fabricating the plated through hole 134 and methods for fabricating the micro vias 131, 132, 133, 135, 136, and 137 are known in the art.

Signals capable of being coupled between the bump 120 and the BGA ball 122 by the micro vias and plated through hole(s) described above include power signals, ground signals, and information signals. As shown in FIG. 1B, first substrate 105 comprises 7 dielectric layers, 151, 152, 153, 154, 155, 156, and 157. In each of the 6 dielectric layers, 151, 152, 153, 155, 156, 157, there is a corresponding micro via, 131, 132, 133, 135, 136, 137. An exemplary thickness of each of the six dielectric layers 151, 152, 153, 155, 156, 157 is about 35 μm. The via stack of FIG. 1B includes micro via, 131, 132, 133, 135, 136, 137, and a plated through hole (PTH) 134. The micro vias 131, 132, 133, 135, 136, 137 are filled with conductive materials, such as copper or aluminum. In the dielectric layer 154, there is a PTH 134. Plated through hole (PTH) is also a type of via. The diameter of the PTH is much larger than the diameters of the micro vias. An exemplary thickness of dielectric layer 154 is about 800 μm. For advanced packaging technology, the thickness of the dielectric layer 154 can be reduced to 400 μm or below.

FIG. 1B shows four conductive layers 111, 112, 113, and 114 above core 143 and 4 conductive layers 115, 116, 117, and 118 below core 143. The conductive path 160 between bump 120 and BGA ball 122 forms a transmission line. The conductive path 160 of FIG. 1B shows many turns, such as turns 161, 162, as a result of staging placement of the micro vias 131, 132, 133, 135, 136, 137, and PTH 134. For advanced packaging, the total number of conductive layers increases to allow more complicated interconnect design. The total number of conductive layers can be 14 layers, or even higher. The increase in total number of conductive layers increases the occurrences of the vertical discontinuity from vertical transitions. Vertical discontinuity can increase impedance mismatch, which result in more return loss. In addition, for advanced device technology, the clock frequency increases, for example from about 1 GHz to about 6.25 GHz. The return loss varies with frequency. Higher operating frequency also worsens the problem of return loss caused by vertical discontinuity.

Return loss is the ratio, whenever a transmission line sees an impedance mismatch, of the amplitude of the reflected wave to the amplitude of the incident wave. Return loss is measured in decibel (dB). Equation (1) shows the relationship between return loss (RL) and input power ($P_{in}$) and reflected power ($P_{re}$).

$$RL=10\log 10(P_{re}/P_{in}) \qquad (1)$$

Figure 2:
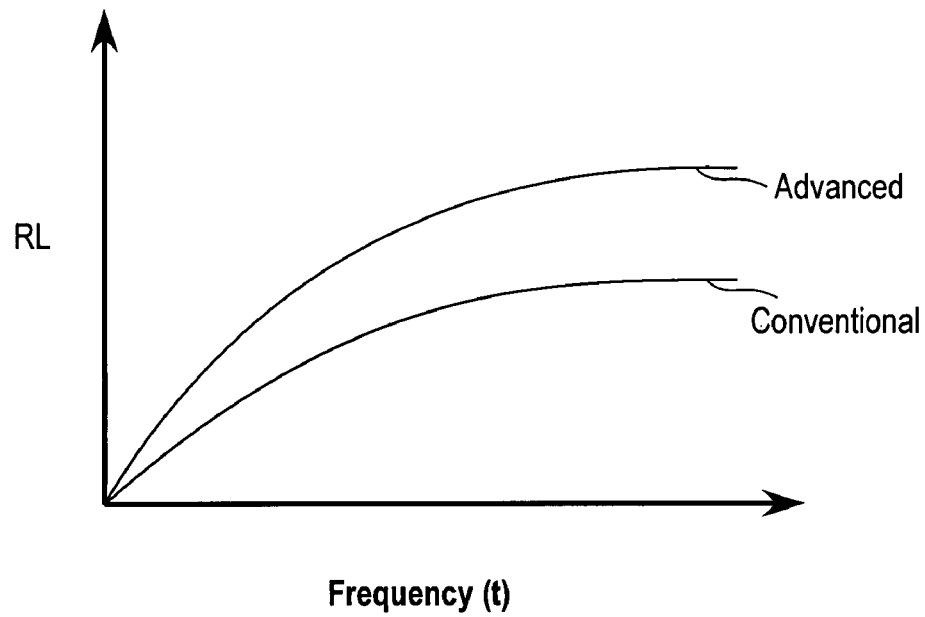
FIG. 2 shows a comparison of return loss between conventional devices and advanced devices as a function of frequency.

For example, if a device has return loss of −10 dB, the reflected power (or energy) from the device is about 10% of the input power. A device with return loss of −20 dB has a reflected power of 1% of the input power. Since it is desirable to have a return loss as small as possible, the return loss value measured in dB should be as low as possible. For example, for some electronic components including electronic devices, such as field programmable gate arrays (FPGAs) and application specific integrated circuits (ASICs), supported on a printed circuit board (PCB), the desirable return loss is below about −15 dB in targeted operating frequency range. FIG. 2 shows an exemplary graph of return loss as a function of frequency for conventional packaging and advanced packaging, which employs more complicated structures and operates at higher frequencies. Conventional packaging interconnect structures are simpler compared to advanced packaging interconnect structures, which have more interconnect levels. In addition, conventional packaging interconnects operate at lower frequency compared to advanced packaging interconnects. Having more interconnect levels and operating at higher frequency range could lead to more return loss. With the increase of return loss for advanced packaging, and especially at higher operating frequencies, it is imperative to seek ways to reduce return loss for advanced packaging to ensure return loss meeting the packaging design criteria.

In one embodiment, the placement of micro vias (including signal vias and ground vias) and PTHs are designed to make the vertical transition of impedance of micro vias and PTHs from one layer to the next following tapered or smooth impedance variation within targeted frequency range. The return loss can be significantly reduced within the targeted frequency range if the impedance values from layer to layer follow a smooth curve.

Figure 3A:
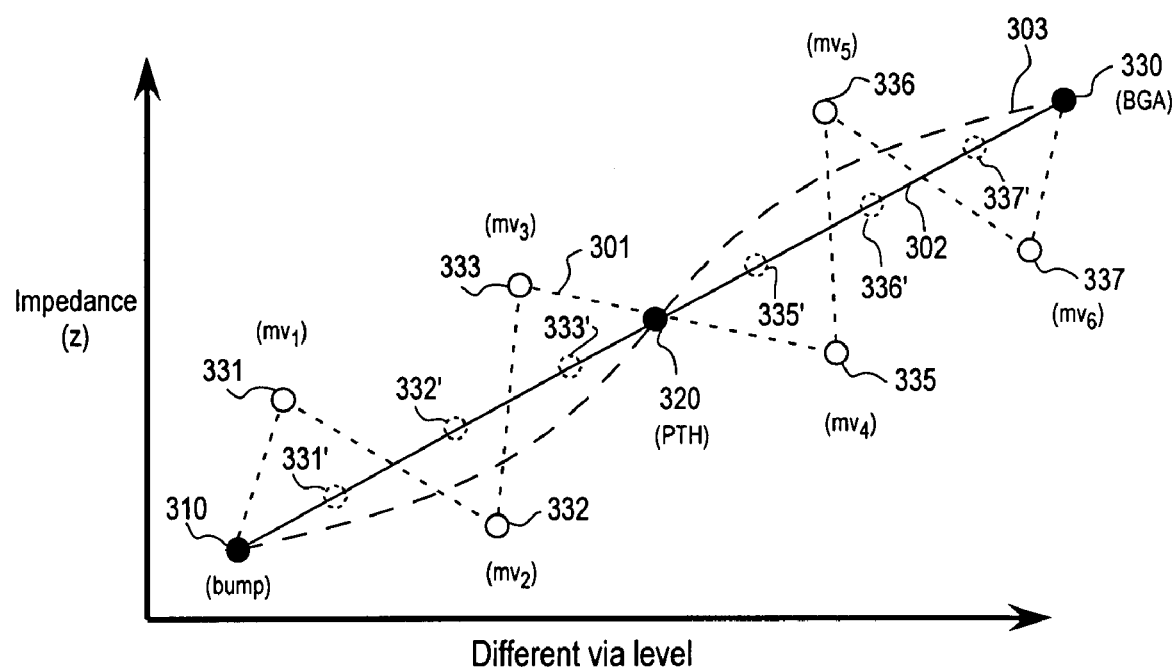
FIG. 3A shows impedance of a bump, a BGA ball, and a PTH along with micro vias at different layers between the bump and the BGA ball, in accordance with one embodiment of the present invention.

For a transmission line, the impedance of the bump, such as bump 120, and the impedance of the BGA, such as BGA ball 122, are fixed. FIG. 3A shows an illustrated dotted zig-zag curve 301 between a bump 310, a PTH 320, and a BGA ball 330. The points 331, 332, 333, 335, 336, and 337 are impedances values measured at micro vias, mv1, mv2, mv3, mv5, mv6, mv7, at different layers. For example, "mv1", "mv2", "mv3", "mv5", "mv6", and "mv7" correlate to micro vias 131, 132, 133, 135, 136, and 137 of FIG. 1B, respectively. The zig-zag curve 301 with impedance values 331, 332, 333, 335, 336, and 337 at different layers in a zig-zag pattern shows that the impedance values at different levels are scattered and do not follow a smooth curve. The return loss would be high for micro vias in a design with impedance curve 301.

FIG. 3A also show a smooth curve 302 between the bump 310, PTH 320, and the BGA ball 330. Curve 302 is almost linear. The smooth curve 302 lacks sharp transitions in the curve. If the impedances at different micro via layers were designed to fall along a smooth curve, such as curve 302, the return loss would be less than the impedance at different micro via layers falling along the zig-zag curve 301. It should be appreciated that the curve 302 in FIG. 3A is merely used as an example. Other shapes of smooth curve, such as curve 303, can also be used. Smooth curve 303 also lacks sharp transitions in the curve. By controlling impedance at different layers to make the impedances at micro vias and PTH at different levels to fall along a smooth curve, the return loss due to vertical discontinuity can be reduced within targeted frequency range. For example, the impedance at "mv1" level is controlled to be near a value of point 331' along curve 302, and at "mv2" at point 332', etc.

Figure 3B:
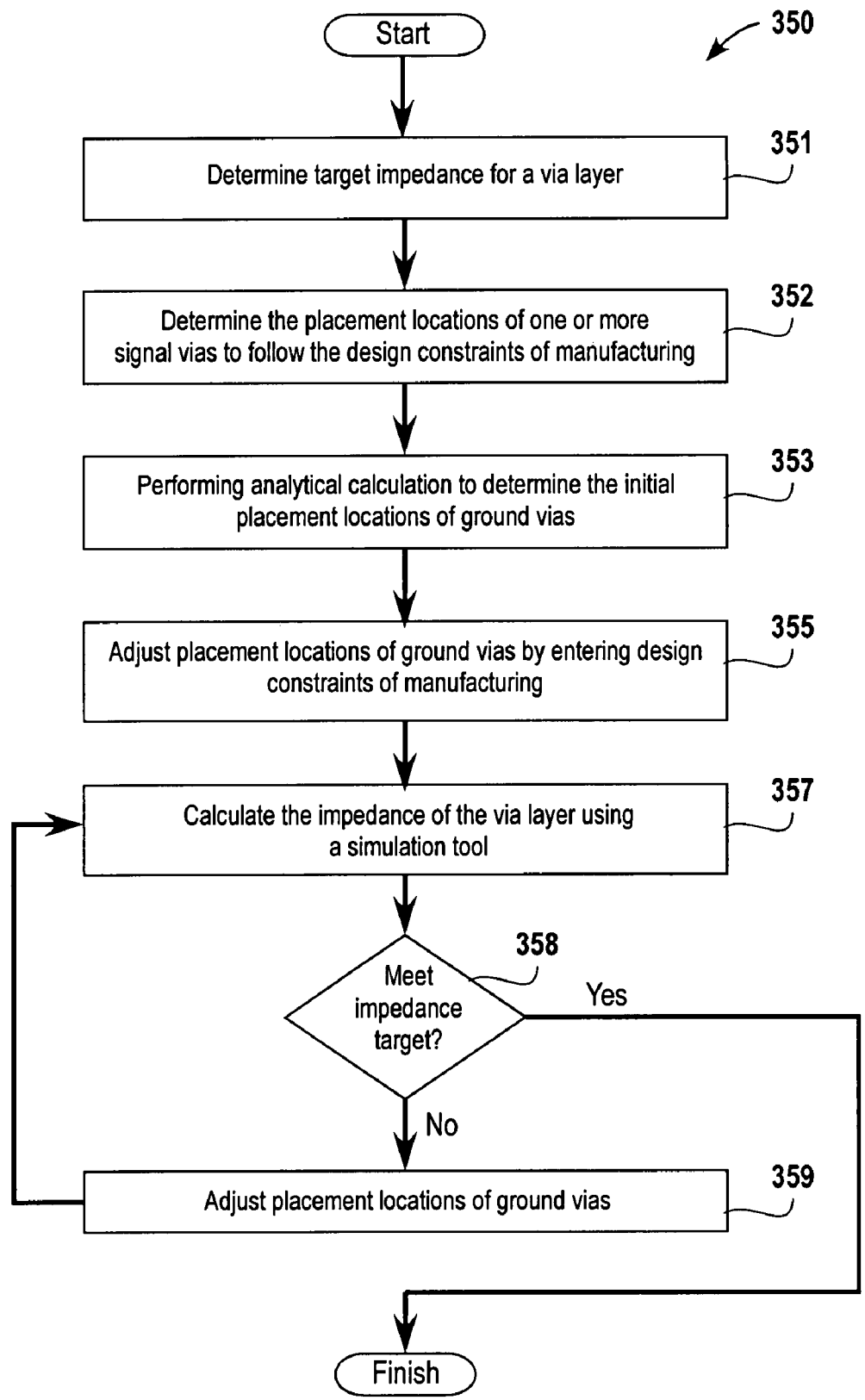
FIG. 3B shows a process flow of designing placement locations of vias of a transmission line between a bump and a BGA ball to reduce return loss, in accordance with one embodiment of the present invention.

FIG. 3B shows an embodiment of a process flow 350 of designing the layout of micro vias and PTH for packaging with controlled impedance, in accordance with the current invention. At operation 351, a target impedance value for a via layer is determined. The target impedance value can be estimated from a smooth curve, such as curve 302 or 303 of FIG. 3A, between the bump and the BGA ball. Alternatively, an interpolation calculation, such as linear interpolation, can be used to calculate the target impedance value.

Figure 3C:
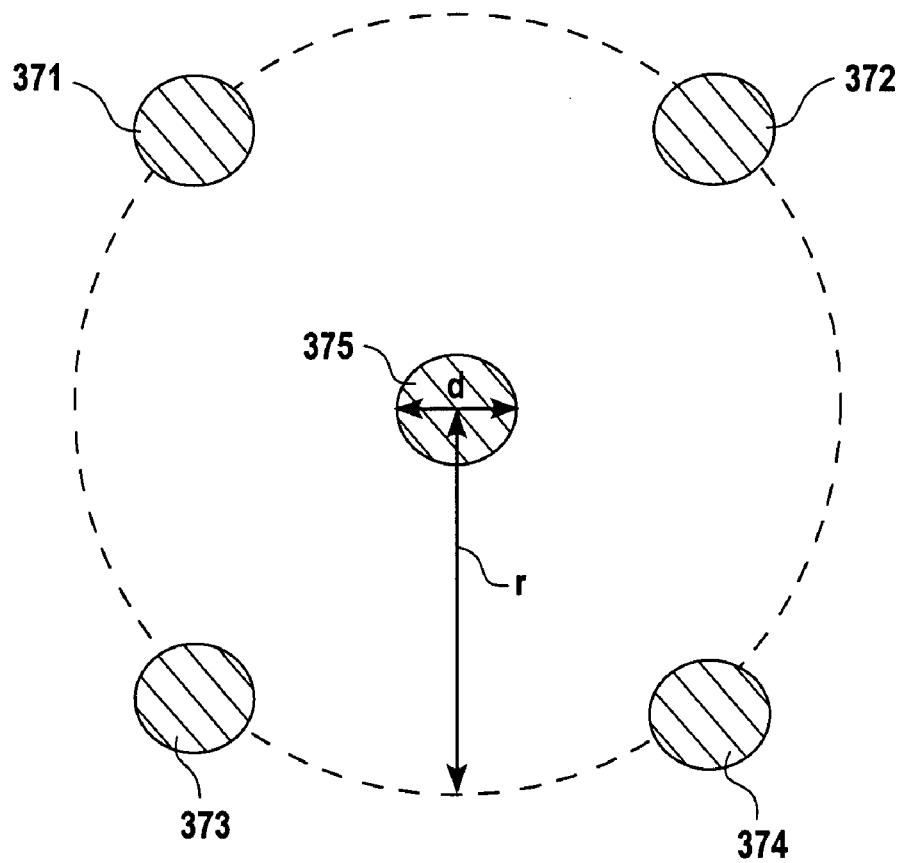
FIG. 3C shows a via layer with four ground vias surrounding a signal via, in accordance with one embodiment of the present invention.

FIG. 3C shows an example of four ground vias 371, 372, 373, and 374, surrounding a signal via 375. At step 352, the location of signal via, such as signal via 375, is determined. For a micro via layer, there can be one or more signal vias. The location of the signal via follows the design constraints of manufacturing. In one embodiment, the center of signal vias at various layers, such as the various dielectric layers shown in FIG. 1B, are aligned with the center of connection bump 120, the center of PTH 134, and the center of BGA ball 122. Other embodiments with signal vias not centrally aligned with the bump, the PTH, and the ball are also possible.

Once the target impedance value and the location of the signal via(s) are determined, analytical estimation of the locations (or placement) of the ground vias is performed. The impedance Z is a function of the diameter, d, of the signal via 375 and the distance, r, from the signal via 375 to the ground vias 371, 372, 373, 374 of FIG. 3C. Equation (2) shows an exemplary analytical relationship between the impedance Z as a function of d and r.

$$Z=60/\mathrm{sqrt}(Er)*\ln(2r/d) \qquad (2)$$

Er is the dielectric constant of the substrate layer where the vias are defined and "sqrt" stands for square root.

With known diameter (d) of the micro vias (signal vias and ground vias) and the targeted impedance values, the designer can use the analytical equation to estimate (by calculation) the initial distance (r) between the signal vias and the ground vias. Once the initial guess of distance r is determined, the initial guess of locations of the ground vias can be determined, for example by assuming the 4 ground vias, 371, 372, 373, and 374, of FIG. 3C are separated evenly to surround the signal via 375.

Analytical equations, such as equation (2), are used to perform an initial estimation (or initial guess) since the analytical equations are based on simple models and are not as accurate as more sophisticated device simulators. Operation 353 of FIG. 3B shows that an analytical estimation, by using an impedance equation, of the placement locations of the ground vias is performed to determine the initial placement locations of ground vias. A user can put the vias at initial placement locations and then calculate the impedance of vias at the placement locations. If the calculated impedance value does not match the target impedance value, the user can adjust the placement locations and recalculate the impedance value. The process repeats until the initial placement locations of vias are determined.

After the initial placement locations of the vias are determined, the design constraints from manufacturing are entered to adjust the placement locations of the signal vias and ground vias, at operation 355. Design constraints from manufacturing could limit the number of micro vias at adjacent layers that can be stacked together. For example, some manufacturers only allow two layers of ground vias at adjacent layers to be stacked together. Another example of design constraints can set a minimal distance between adjacent micro vias. Designers enter these design constraints and adjust the placement locations of the micro vias to ensure no design constraint is violated.

Afterwards at operation 357, a design simulator, such as Si2D, is used to calculate the impedance of vias on each layer. Si2D is a 2-dimensional device simulation tool made by Ansoft of Pittsburgh, Pa. Si2D is a quasi-static electromagnetic-field simulation for parasitic extraction of electronic components program. The calculated impedance needs to be very close to the target impedance value, for example the difference being less than 10% of the targeted impedance value, set at operation 351. At operation 358, a question of whether the calculated impedance meets the target value is asked. If the answer is yes, the placement locations of signal and ground vias for the particular layer are finalized and the process proceeds to "finish". If not, the placement locations are adjusted at operation 359, and the impedance is recalculated again at operation 357. The placement location adjustment at operation 359 needs to follow the constraints of manufacturing. The adjustment and calculation repeat until the impedance meets the target value. The exemplary method shown in FIG. 3B allows designers to design the placement locations of signal and ground vias with controlled impedance. The exemplary method shown in FIG. 3B is repeated for each via layer.

Figure 4A:
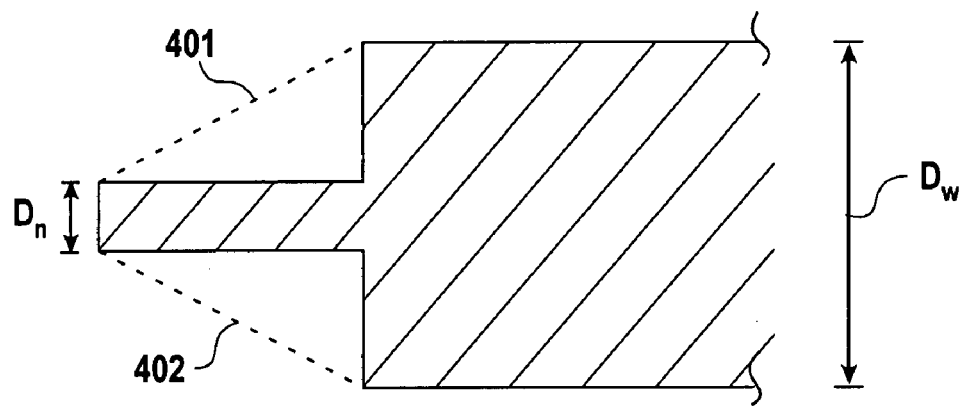
FIG. 4A shows a top view of a conductive wire with a narrow portion and a wide portion, in accordance with one embodiment of the present invention.

Some advanced devices need to perform under a wider bandwidth with a wider range of operating frequencies, such as between about 0 GHz to about 15 GHz. Devices operating at higher frequencies, such as at frequency greater than 10 GHz, geometry discontinuity can further affect the bandwidth of operation and increase return loss. FIG. 4A shows a top view of an exemplary conductive wire with a narrow portion with a width of $D_n$ and a wide portion with a width of $D_w$. $D_n$ is substantially smaller than $D_w$. The discontinuity between the wide and narrow portions not only results in additional return loss, but also limits the bandwidth of operating frequency range, especially at high frequency. If the transition between the wide and narrow portions can be made gradual, such as along curves 401 and 402, the return loss can be reduced and the bandwidth can be increased.

As mentioned above in FIG. 1B, the conductive path 160 between bump 120 and BGA ball 122 forms a transmission line. The conductive path 160 of FIG. 1B shows many turns, such as turns 161, 162, as a result of staging placement of the micro vias 131, 132, 133, 135, 136, 137, and PTH 134. Moreover, micro vias, PTH, and balls have significant dimension disparity, for example from a diameter of 60 μm for micro vias, a diameter of 150 μm for PTHs, to a diameter of 600 μm for BGA balls, which could potentially create a very large vertical geometry discontinuity as illustrated in FIG. 4A. For advanced packaging, the total number of conductive layers increases and results in a more complicated interconnect design. The increase in total number of conductive layers increases the occurrences of the vertical discontinuity, which increase impedance and results in return loss.

Figure 4B:
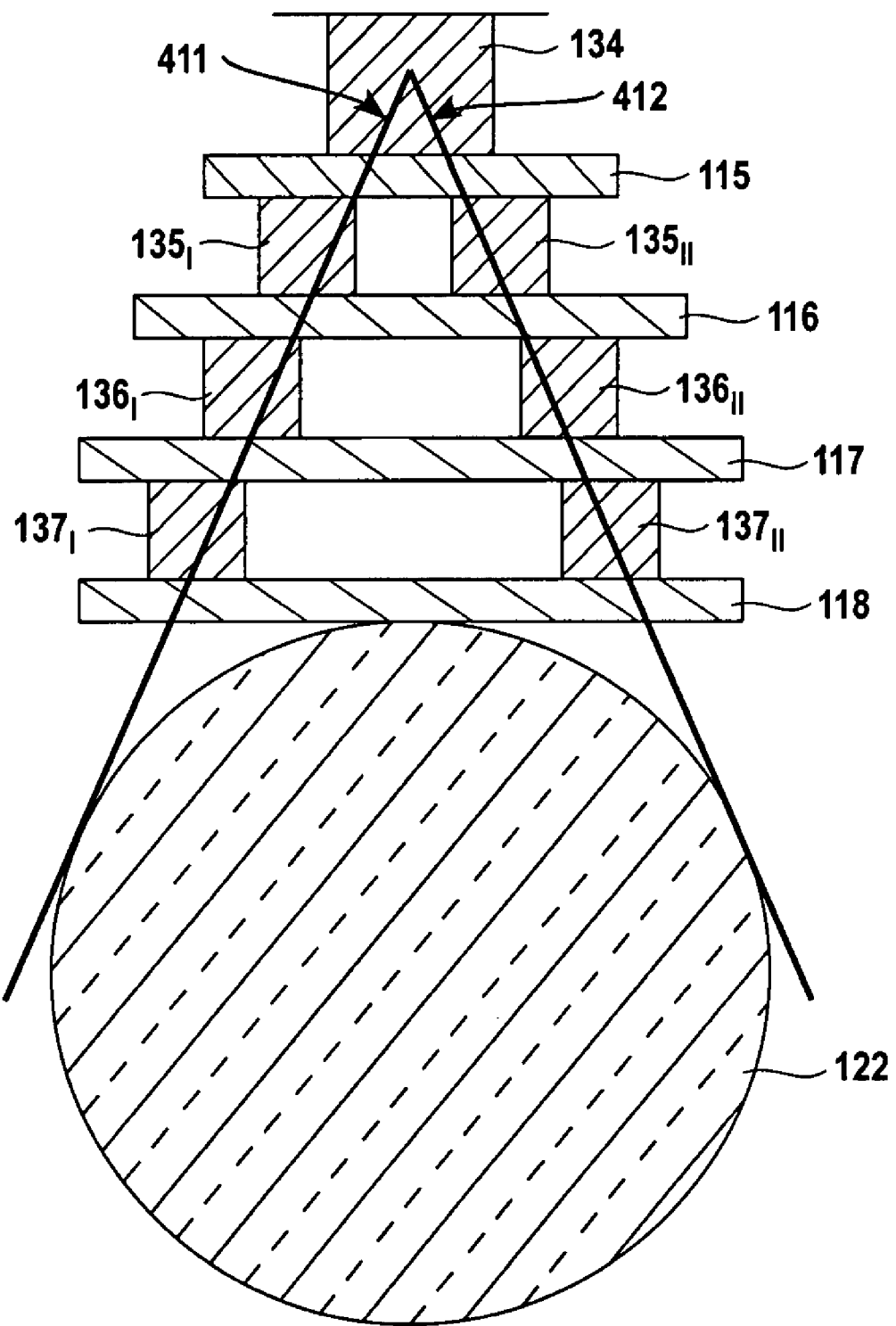
FIG. 4B shows a cross-sectional view of a design of placement of vias between a plated through hole (PTH) and a ball of a BGA, in accordance with one embodiment of the present invention.

FIG. 4B shows an embodiment of a cross section of a portion of a transmission line between the PTH 134 and the BGA ball 122, with micro vias $135_I$, $135_{II}$, $136_I$, $136_{II}$, $137_I$, and $137_{II}$, at three different levels. In FIG. 4B, the center of the PTH 134, centers of micro vias $135_I$, $135_{II}$, $136_I$, $136_{II}$, $137_I$, and $137_{II}$ at different levels, and the edge of the BGA ball 122 are aligned. In addition, the centers of PTH 134 and the BGA ball 122 are also aligned. The center of PTH 134, the centers of micro vias $135_I$, $135_{II}$, $136_I$, $136_{II}$, $137_I$, and $137_{II}$, and the outer edges of BGA ball 122 fall along two smooth curves 411, 412. Smooth curves 411, 412 lack sharp transitions in the curves. The smooth geometry transition, which lacks sharp transitions of via locations from layer to layer, would reduce the loss and improve the bandwidth of operation.

The example in FIG. 4B shows a smooth geometry transition between a PTH 134 and a ball 122 of a BGA. However, if possible, the geometry continuity should be maintained between a bump, such as bump 120 of FIG. 1B, and the PTH, such as PTH 134 of FIG. 1B, as well. Curves similar to 411, 412 can also be drawn between a bump, and a PTH in a diagram similar to FIG. 4B, but the ball 122 is replaced with a bump, such as bump 120. In addition, the example in FIG. 4B of having the center of PTH 134, the centers of micro vias $135_I$, $135_{II}$, $136_I$, $136_{II}$, $137_I$, and $137_{II}$, to be aligned with the outer edges of ball 122 is only one of the embodiments. Other embodiments with the outer edges of the PTH 134 and outer edges of micro vias $135_I$, $135_{II}$, $136_I$, $136_{II}$, $137_I$, and $137_{II}$, to be aligned with the outer edges of ball 122 are also possible.

Figure 4C:
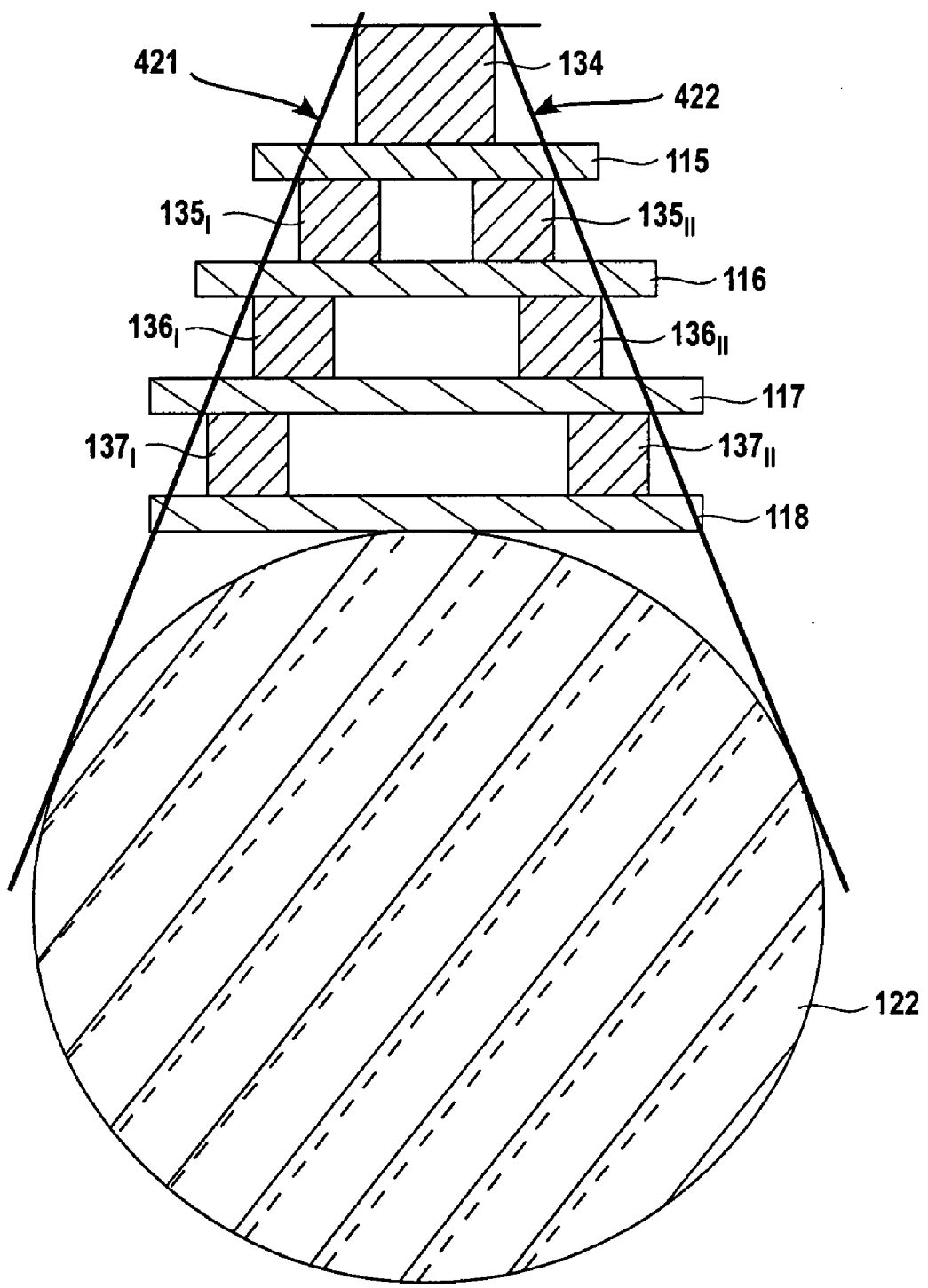
FIG. 4C shows a cross-sectional view of a design of placement of vias between a plated through hole (PTH) and a ball of a BGA, in accordance with another embodiment of the present invention.

FIG. 4C shows another embodiment of a smooth geometry transition between the PTH 134 and the ball 122 of the BGA, shown in FIG. 4B. The outer edge of PTH 134, the outer edges of micro vias $135_I$, $135_{II}$, $136_I$, $136_{II}$, $137_I$, and $137_{II}$, and the outer edges of BGA ball 122 fall along two smooth curves 421, 422. Smooth curves 421, 422 lack sharp transitions in the curves. The smooth geometry transition, which lacks sharp transitions of via locations from layer to layer, would reduce the loss and improve the bandwidth of operation. Curves 411, 412, 421, and 422 of FIGS. 4B and 4C appear to be linear. However, they not need to be linear. Any shape of smooth curves would be applicable for curves 411, 412, 421, and 422. As discussed above for FIG. 4B, the example in FIG. 4C shows a smooth geometry transition between the PTH 134 and the ball 122 of the BGA. However, if possible, the geometry continuity should be maintained between a bump, such as bump 120 of FIG. 1B, and the PTH, such as PTH 134 of FIG. 1B, as well.

Figure 4D:
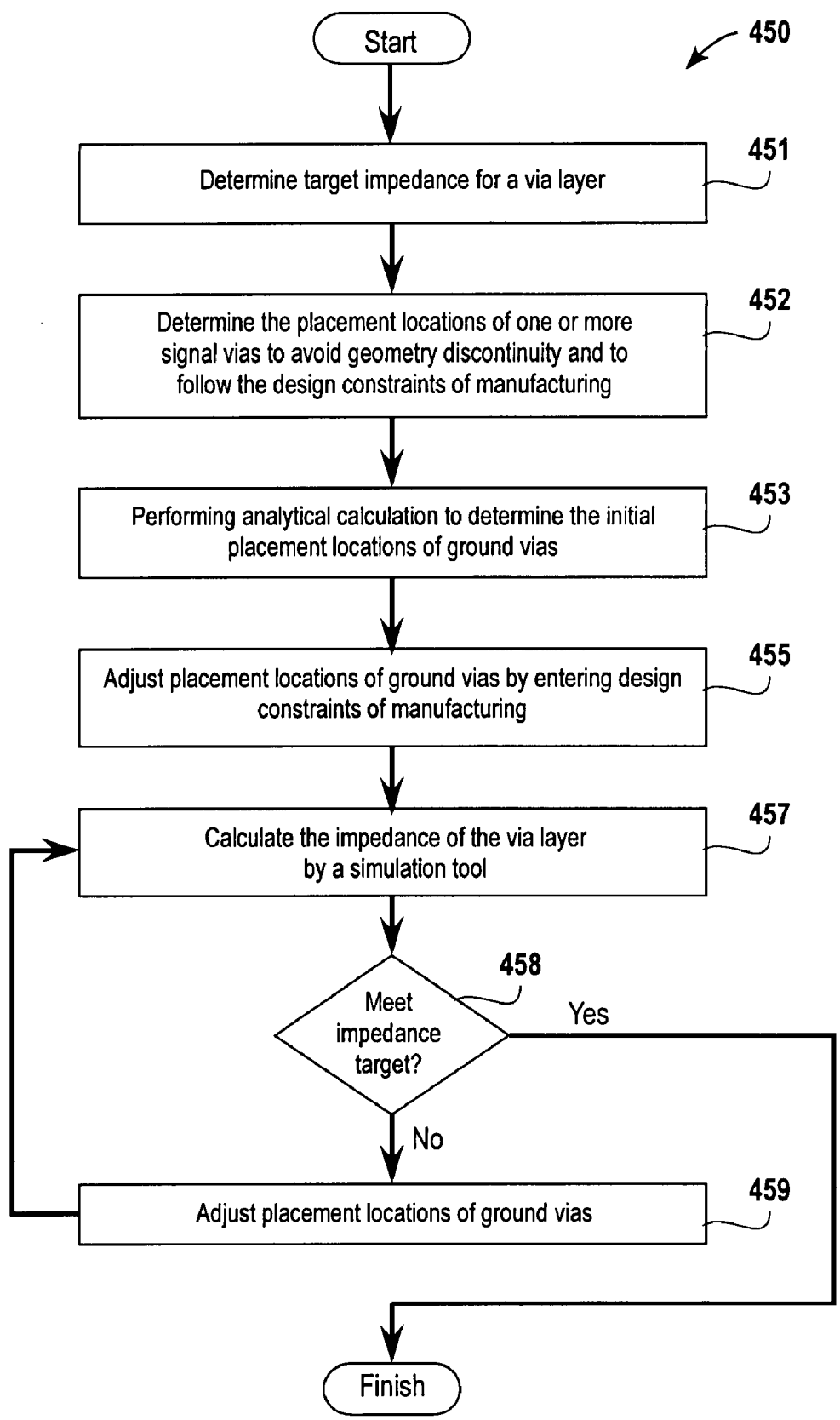
FIG. 4D shows a process flow of designing placement locations of vias of a transmission line between a bump and a BGA ball to reduce return loss, in accordance with one embodiment of the present invention.

FIG. 4D shows an embodiment of a process flow 450 of designing the layout of micro vias and PTH for packaging with controlled impedance and smooth geometry transition to widen bandwidth of operation, in accordance with the current invention. As described above, micro vias, PTH, and balls have significant dimension disparity, which could potentially create a very large vertical geometry discontinuity. To achieve smooth geometry transition with controlled impedance to widen bandwidth, the number of signal vias, and accompanying ground vias, need to be increased at layers closer to the BGA ball 122 of FIG. 4B.

At operation 451, a target impedance value for the vias of a via layer is determined. The target impedance value for the particular layer can be estimated from a smooth impedance curve, such as curve 302 of FIG. 3A, between the bump and the BGA ball. Alternatively, a linear interpolation can be used to calculate the target impedance value. Once the target impedance value is determined, analytical estimation of the location (or placement) of the via (micro via or PTH) is performed, using an analytical equation such as equation (2).

At step 452, the locations of signal vias, such as signal via 375 are determined. The locations of the signal vias at different levels avoid geometry discontinuity and follow design constraints of manufacturing, both discussed above. Examples of how to place signal vias to avoid geometry discontinuity have been discussed in paragraphs related to FIG. 4B. The importance of avoiding geometry discontinuity for broadband application has been described above.

After the locations of signal vias have been determined, operation 453 shows that an analytical estimation of the placement locations of the ground vias is performed by equation, such as equation (2), to determine the initial placement locations of ground vias. As discussed above, a user can put the ground vias at initial placement locations and then calculate the impedance of vias at the placement locations. If the calculated impedance value does not match the target impedance value, the user can adjust the placement locations and recalculate the impedance value. The process repeats until the initial placement locations of vias are determined. Equation (2) is too simple for a dielectric layer with multiple signal vias and even more accompanying ground vias. Other suitable equations can be used instead.

After the initial placement locations of the ground vias are determined by analytical method, such as using an equation, the design constraints from manufacturing are entered to adjust the placement locations of the ground vias, at operation 455. As discussed above, design constraints from manufacturing could limit the number of micro vias at adjacent layers that can be stacked together. For example, some manufacturers only allow two layers of micro vias at adjacent layers to be stacked together. Another example of design constraint can set a minimal distance between adjacent vias. Designers enter these design constraints and adjust the placement locations of the vias to ensure no design constraint is violated.

Afterwards at operation 457, a design simulator, such as SI2D, is used to calculate the impedance of each layer. The impedance needs to be very close to the target impedance value, for example the difference being less than 10% of the targeted impedance value, set at operation 451. At operation 458, a question of whether the calculated impedance meets the target value is asked. If the answer is yes, the placement locations of signal and ground vias for the particular layer are finalized and the process proceeds to "finish". If not, the placement locations of ground vias are adjusted at operation 459, and the impedance is recalculated again at operation 457. The placement location adjustment at operation 459 needs to follow the constraints of manufacturing and the needs to avoid large geometry discontinuity. The adjustment and calculation repeat until the impedance meets the target value. The exemplary method shown in FIG. 4D allows designers to design the placement locations of signal and ground vias with controlled impedance and avoiding geometry discontinuity to broaden bandwidth of operation. The exemplary method shown in FIG. 4D is repeated for designing the placement of each via layer.

Figure 5A:
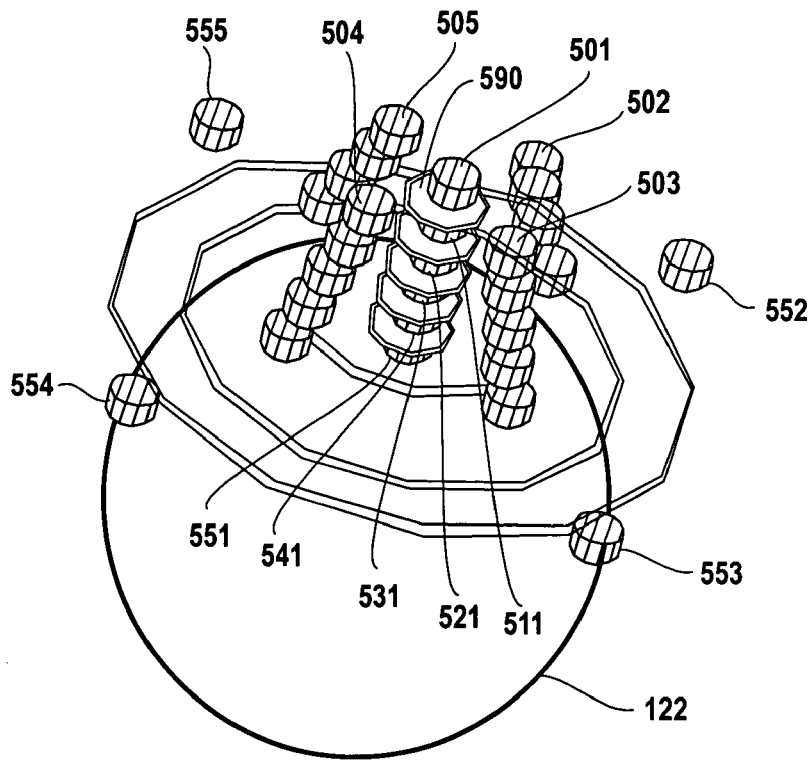
FIG. 5A shows a three-dimensional (3D) view of design of placement of vias from a plated through hole (PTH) to a ball of a BGA, in accordance with one embodiment of the present invention.

FIG. 5A shows an embodiment of a 3-dimensional (3-D) diagram of a portion of a transmission line with six levels of micro vias on top of a BGA ball (design A). The placement of signal and ground vias of FIG. 5A is designed with the smooth impedance transition from layer to layer only. The top layer of micro vias is right below the core (with PTH), which is not shown here. The signal vias 501, 511, 521, 531, 541, 551, 561 are stacked on top of one another pointing toward (or aligning with) the center of the BGA ball. Each signal via is landed on a pad, such as pad 590.

Figures 5B, 5C:
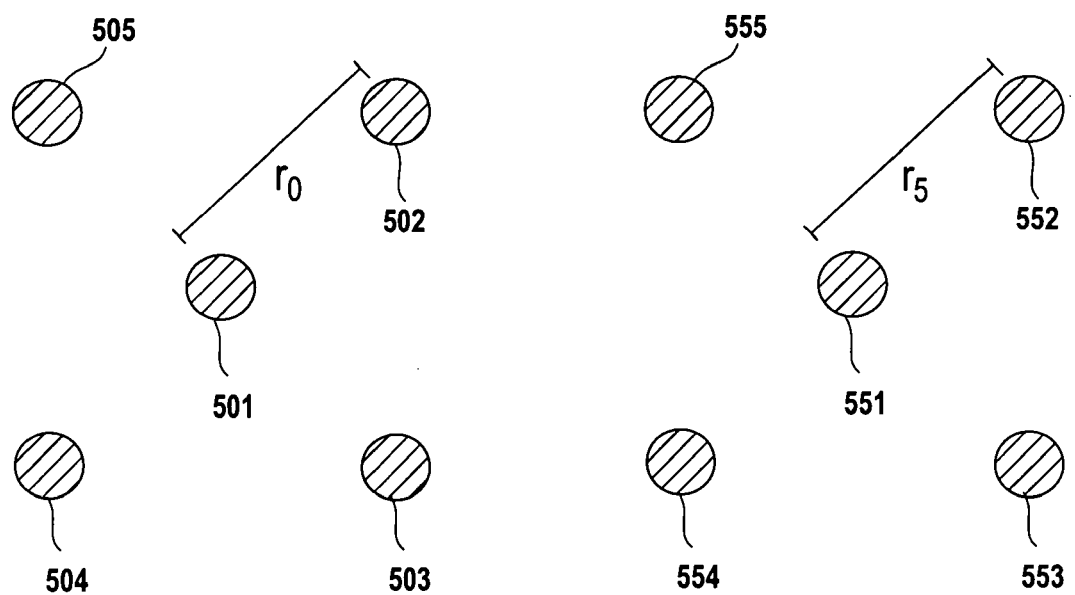
FIG. 5B shows a top view of a signal via view surrounded by four ground vias of a top via layer of FIG. 5A, in accordance with one embodiment of the present invention.
FIG. 5C shows a top view of a signal via surrounded by four ground vias of a bottom via layer of FIG. 5A, in accordance with one embodiment of the present invention.

Each signal via on each level is surrounded by four ground vias, such as ground vias 502, 503, 504, 505 surrounding signal via 501. FIG. 5B shows top-level ground vias 502, 503, 504, 505 surrounding top-level signal via 501. The distance between signal via 501 and each of the surrounding ground via (502, 503, 504, or 505) is $r_0$. FIG. 5C shows sixth-level ground vias 552, 553, 554, 555 surrounding sixth-level signal via 551. The distance between signal via 551 and each of the surrounding ground via (552, 553, 554, or 555) is $r_5$. Distance $r_0$ is smaller than distance $r_5$. As discussed above, the layout of the micro vias is designed to control the impedance along a smooth transition between the impedance of PTH and the impedance of BGA ball, as described for FIGS. 3A and 3B.

Figure 5D:
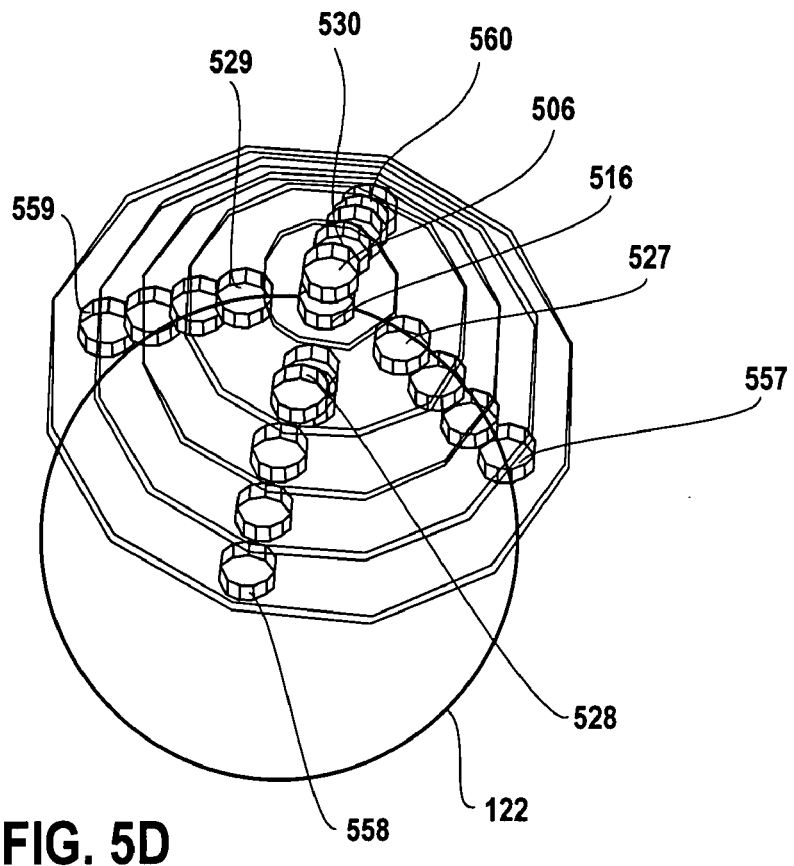
FIG. 5D shows a 3D view of design of placement of signal vias between a plated through hole (PTH) and a ball of a BGA, in accordance with one embodiment of the present invention.
Figure 5E:
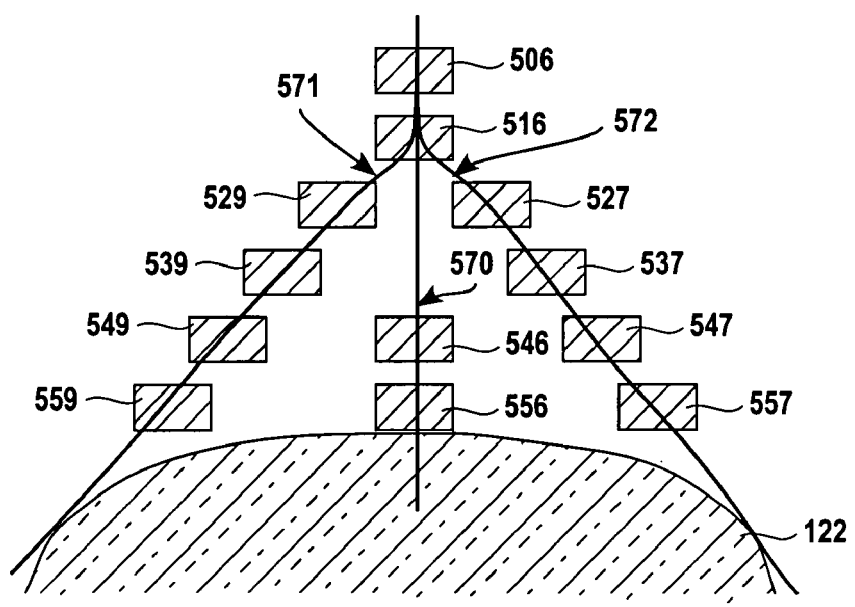
FIG. 5E shows a cross-sectional view of placement of signal vias between a plated through hole (PTH) and a ball of a BGA, in accordance with one embodiment of the present invention.
Figure 5F:
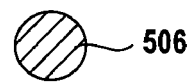
FIG. 5F shows a top view of a signal via of a top micro via layer of FIG. 5D, in accordance with one embodiment of the present invention.
Figure 5G:
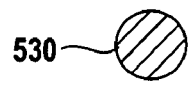
FIG. 5G shows a top view of five signal vias of a third micro via layer of FIG. 5D, in accordance with one embodiment of the present invention.
Figure 5G:
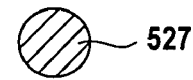
Figure 5G:
Figure 5G:
Figure 5H:
FIG. 5H shows a top view of five vias of a sixth micro via layer of FIG. 5D, in accordance with one embodiment of the present invention.
Figure 5H:
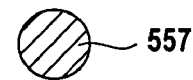
Figure 5H:
Figure 5H:
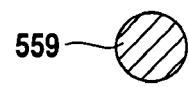
Figure 5H:

FIG. 5D shows another embodiment of a 3-dimensional (3-D) diagram of a portion of a transmission line with six levels of micro vias on top of a BGA ball (design B). The placement of signal and ground vias of FIG. 5D is designed with the smooth impedance transition from layer to layer and with smooth geometry transition of signal vias. The top layer of micro vias is right below the core (with PTH). In this diagram, only the signal vias are shown. Ground vias are not shown in FIG. 5D. However, ground vias are needed to form return path of the transmission line(s), and they need to be placed in a manner to realize smooth impedance transition from PTH to ball. FIG. 5E is a two-dimensional (2-D) diagram of FIG. 5D. FIG. 5E is cut along the center of ball 122 and the centers of signal vias 506 and 516. There is one signal via 506 or 516 on each of the top two layers, as shown in FIGS. 5E and 5F. There are four signal vias in each of the $3^{rd}$ and $4^{th}$ layers. There are five signal vias on each of the bottom two layers. The four signal vias at the third-level are signal vias 527, 528, 529, and 530, as shown in FIGS. 5D, and 5G, with these signal via evenly spaced and centered along a line connecting the centers of signal vias 506 and 516, and the center of ball 122. FIG. 5E only shows signal vias 527 and 529 because it is a 2-D diagram. The five signal vias at the sixth-level are signal vias 556, 557, 558, 559, and 560, as shown in FIGS. 5D and 5H, with signal via 556 at the center. FIG. 5E only shows signal vias 556, 557, and 559.

The centers of signal vias 506, 516, 546, and 556, the center of ball 122 form a linear line 570. The center of signal vias 506, 516, 527, 537, 547, and 557 and the edge of ball 122 form a smooth curve 572. The center of signal vias 506, 516, 529, 539, 549, and 559 and the edge of ball 122 form a smooth curve 571. The placement of signal vias of design B in FIGS. 5D and 5E avoids geometry discontinuity and meets manufacturing constraints. The placement of associating ground vias for each signal vias is not shown here. However, they follow the manufacturing constraints, meet the impedance target for each layer, and the meet the requirement of smooth transition of impedance values form layer to layer. The design in FIG. 5D (design B) has taken the impedance control and geometry continuity into consideration.

Figure 6A:
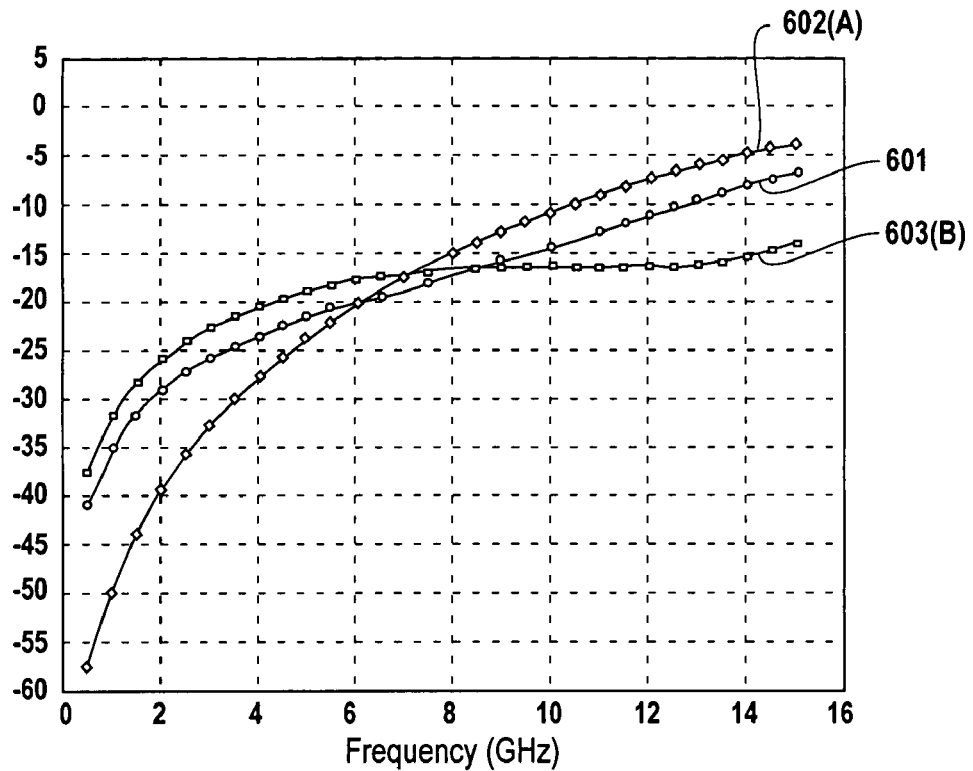
FIG. 6A shows a comparison of return loss of a conventional via placement design, a via placement design with impedance control only, and a via placement design with impedance and geometry control as a function of frequency, in accordance with one embodiment of the present invention.

FIG. 6A shows return loss as a function of frequency for three designs. Curve 601 (conventional) shows a conventional design without regard to impedance control or geometry control. Curve 602 (design A) shows the return loss of design of FIG. 5A, which follows impedance control restriction with no consideration of geometry continuity. Curve 603 (design B) shows the return loss of design of FIG. 5D, which follows both impedance control and geometry control restrictions. The results show that Curve 602, with design of FIG. 5A, has lowest return loss at a frequency range up to about 6 GHz (lower frequency range). The design of FIG. 5A can be used for devices operating in a relatively low frequency range. By following the impedance control guidelines in designing the vertical transition in the transmission line, the return loss can be greatly reduced compared to the conventional design.

Curve 603 (design B) shows a flatter curve, which means a broader operating bandwidth. Design B can operate up to frequency of 14 GHz with return less than −15 dB. The results in FIG. 6A indicate that design B is suitable for devices operating in a wider frequency range (i.e. broadband). Design B (curve 603) has poorer return loss performance at low frequency range because additional signal vias are needed at dielectric layers closer to the BGA ball to avoid geometry discontinuity.

In addition to return loss, another criteria for judging the performance of different packaging designs is insertion loss. Insertion loss is the loss resulting from inserting a transmission line between a source and a load and measures the loss in load power due to the insertion. Insertion loss is expressed as the ratio in decibels of the power received at the load after insertion of the apparatus (or components), to the power received before insertion. The lower the insertion loss is, the better the design is. Equation (3) shows the relationship between insertion loss (IL) and power received after insertion ($P_{ai}$) of component and power received before insertion ($P_{bi}$) of component.

$$IL=10 \log 10(P_{ai}/P_{bi}) \quad (3)$$

When there is no insertion loss, the IL (insertion loss) value is zero. Therefore, the close the IL value to zero, the less the insertion loss.

Figure 6B:
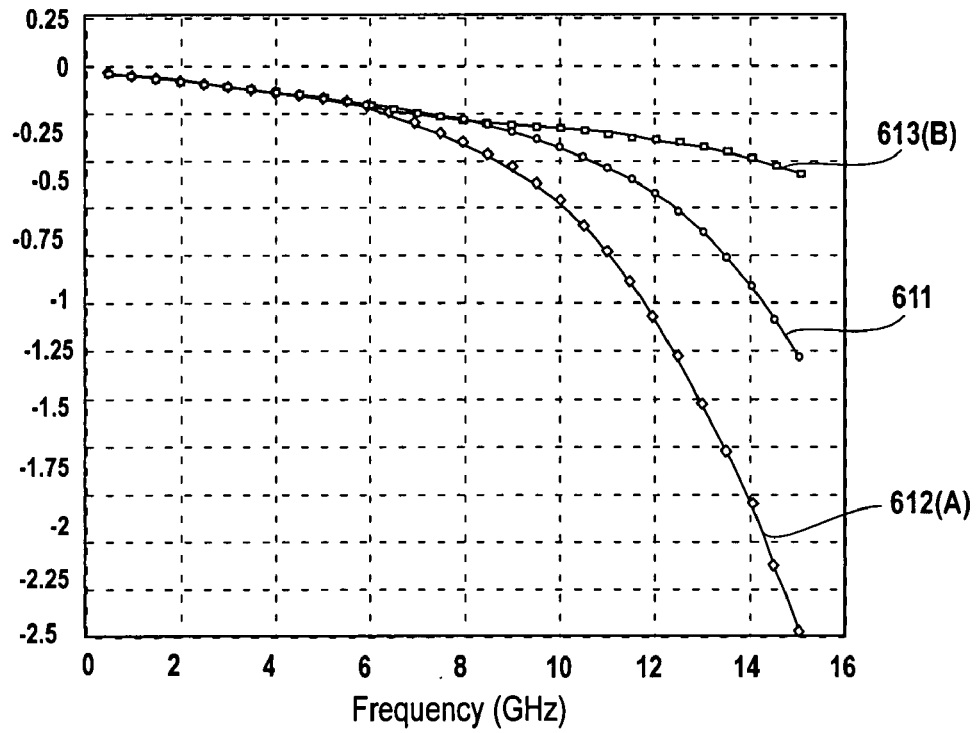
FIG. 6B shows a comparison of insertion loss of a conventional via placement design, a via placement design with impedance control only, and a via placement design with impedance and geometry control as a function of frequency, in accordance with one embodiment of the present invention.

FIG. 6B shows the insertion loss as a function of frequency for the conventional design (curve 611), design of FIG. 5A (curve 612), and the design of FIG. 5D (curve 613). The insertion loss results show that curve 613, with the design of FIG. 5D, has the smallest range of insertion loss over the frequency range up to about 15 GHz. The insertion loss data of FIG. 6B also support that design of FIG. 5D (or design B) improves the operating bandwidth. The design of FIG. 5A (curve 612) has acceptable IL at low frequencies, such as up to 6 GHz. The insertion loss data here support that design of FIG. 5A (or design A) is suitable for operating at low frequency range. Design A performs better than the conventional design in the low frequency range. Design B perform better than the conventional design and Design A at higher frequency range. The performance of Design B at lower frequency range is acceptable, such as below −15 dB for return loss. Therefore, Design B is suitable for devices for pursuing wide frequency range of operation.

The exemplary designs in FIGS. 5A, and 5B and their results in FIGS. 6A, and 6B show that impedance control and geometry control help reduce the return loss and insertion loss. For devices operating at low frequency, designing via layout for transmission line(s) with impedance control only (Design A) can greatly reduce return loss. For advanced devices with multiple levels of vias and wide range of operating bandwidth, the via layout designs should take impedance control and geometry continuity control into consideration, such as Design B.

The embodiments, described herein may be employed with any integrated circuit, such as processors and programmable logic devices (PLDs). Exemplary PLDs include but are not limited to a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the STRATIX® II GX devices owned by the assignee.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for designing placement locations of micro vias of a via layer of a transmission line in a multi-layer ball grid away (BGA) package for a semiconductor die, comprising:
   determining a target impedance value for the via layer, wherein the determined target impedance value for the layer is along a smooth impedance curve between an impedance of a bump and an impedance of a ball of a BGA;
   determining placement location of at least one signal via of micro vias, wherein the placement location follows design constraints of manufacturing;
   performing an analytical calculation to determine initial placement locations of a plurality of ground vias of the micro vias of the via layer;
   adjusting the placement locations of the plurality of ground vias by taking the design constraints of manufacturing into consideration; and
   calculating an impedance of the via layer by using a simulation tool after the placement locations of the vias have been adjusted, wherein each method operation is executed through a processor.

2. The method of claim 1, further comprising:
   determining if the calculated impedance of the via layer meets the target impedance value,
   if the calculated impedance of the via layer meets the target impedance value, the placement locations of the signal and ground vias of the via layer are accepted,
   if the calculated impedance of the via layer does not meet the target impedance value, the placement locations of the ground vias are adjusted and the impedance of the via layer is recalculated, the determining operation being repeated until the calculated impedance of the via layer meets the target impedance value.

3. The method of claim 1, wherein the determining placement location of at least one signal via of micro vias includes placing the at least one signal via to follow a smooth geometry transition in the transmission line.

4. The method of claim 1, wherein the target impedance is determined by one of linear interpolation between the impedance of the bump and the impedance of the ball of the ball grid array or graphical interpolation along the smooth impedance curve between the impedance of the bump and the impedance of the ball of the ball grid array.

5. The method of claim 1, wherein the bump, the micro vias of the via layer, a plated through hole (PTH), and the ball are part of the transmission line.

6. The method of claim 3, wherein placing the at least one signal via to follow the smooth geometry transition is performed by placing the at least one signal via along a smooth curve going through a center of a PTH and an outer edge of the ball of the BGA.

7. The method of claim 6, wherein both the smooth impedance curve and the smooth curve lack sharp transitions in the curves.

8. The method of claim 3, wherein placing the at least one signal via to follow smooth geometry transition to avoid geometry discontinuities of signal vias of multiple via layers of the multi-layer BGA package reduces return loss and insertion loss of the transmission line at high operating frequency range.

9. The method of claim 3, wherein placing the at least one signal via to follow smooth geometry transition to avoid geometry discontinuities of signal vias of multiple via layers of the multi-layer BGA package widens an operating frequency range of devices in the semiconductor die.

10. The method of claim 1, wherein the analytical calculation determines an impedance.

11. The method of claim 1, wherein the analytical calculation the analytical calculation is a function of a diameter of the signal via and a distance between the signal via and one of the ground vias.

12. The method of claim 1, wherein the analytical calculation the analytical calculation is $Z=60/\sqrt{Er}*\ln(2r/d)$.

13. A method for designing placement locations of micro vias of a via layer of a transmission line in a package for a semiconductor die to widen a range of operating frequencies of devices in the semiconductor die, comprising:
determining a target impedance value for the via layer, wherein the determined target impedance value for the layer is along a smooth impedance curve between an impedance of a bump and an impedance of a ball of a ball grid array (BGA);
determining placement location of at least one signal via of micro vias, wherein the placement location avoids geometry discontinuities in the transmission line performing an analytical calculation to determine initial placement locations of a plurality of ground vias of the micro vias of the via layer;
calculating a distance between ground vias of the micro vias of the via layer and the at least one signal vias to determine initial placement locations of the ground vias; and
calculating an impedance of the via layer by using a simulation tool after the placement locations of the vias have been adjusted, wherein each method operation is executed through a processor.

14. The method of claim 13, further comprising:
determining if the calculated impedance of the via layer meets the target impedance value,
if the calculated impedance of the via layer meets the target impedance value, the placement locations of the signal and ground vias of the via layer are accepted,
if the calculated impedance of the via layer does not meet the target impedance value, the placement locations of the ground vias are adjusted and the impedance of the via layer is recalculated, the determining operation being repeated until the calculated impedance of the via layer meets the target impedance value.

15. The method of claim 13, wherein the target impedance is determined by one of linear interpolation between the impedance of the bump and the impedance of the ball of the ball grid array or graphical interpolation along the smooth impedance curve between the impedance of the bump and the impedance of the ball of the ball grid array.

16. The method of claim 13, wherein the placement locations at least one signal via and the ground vias follow design constraints of manufacturing.

17. The method of claim 13, wherein adjusting placement locations of vias to follow the smooth geometry transition is performed by placing the at least one signal via along a smooth curve between an outer edge of the bump and an outer edge of the ball of the BGA.

18. The method of claim 13, wherein determining placement location of at least one signal via to follow a smooth geometry transition to avoid geometry discontinuity in the transmission line reduces return loss and insertion loss of the transmission line over a frequency range between about 0 GHz to about 15 GHz.

19. The method of claim 13, wherein placing the at least one signal via to follow smooth geometry transition to avoid geometry discontinuity of signal vias of multiple via layers of the multi-layer BGA package reduces return loss and insertion loss of the transmission line and widens the operating frequency range of the devices.

20. A computer readable medium including program instructions for designing placement locations of micro vias of a via layer of a transmission line in a package for a semiconductor die to widen a range of operating frequencies of devices in the semiconductor die, comprising:
program instructions for determining a target impedance value for the via layer, wherein the determined target impedance value for the layer is along a smooth impedance curve between an impedance of a bump and an impedance of a ball of a ball grid away (BGA);
program instructions for determining placement location of at least one signal via of micro vias, wherein the placement location avoids geometry discontinuities in the transmission line program instructions for performing an analytical calculation to determine initial placement locations of a plurality of ground vias of the micro vias of the via layer;
program instructions for calculating a distance between ground vias of the micro vias of the via layer and the at least one signal vias to determine initial placement locations of the ground vias; and
program instructions for calculating an impedance of the via layer after the placement locations of the vias have been adjusted.

21. The computer readable medium of claim 20, further comprising:
program instructions for determining if the calculated impedance of the via layer meets the target impedance value,
if the calculated impedance of the via layer meets the target impedance value, the placement locations of the signal and ground vias of the via layer are accepted, if the calculated impedance of the via layer does not meet the target impedance value, the placement locations of the ground vias are adjusted and the impedance of the via layer is recalculated, the determining operation being repeated until the calculated impedance of the via layer meets the target impedance value.

22. The computer readable medium of claim 20, wherein the target impedance is determined by one of linear interpolation between the impedance of the bump and the impedance of the ball of the ball grid array or graphical interpolation along the smooth impedance curve between the impedance of the bump and the impedance of the ball of the ball grid array.

23. The computer readable medium of claim 13, wherein placing the at least one signal via to follow smooth geometry transition to avoid geometry discontinuity of signal vias of multiple via layers of the multi-layer BGA package reduces return loss and insertion loss of the transmission line and widens the operating frequency range of the devices.

* * * * *